(12) United States Patent
Stanton et al.

(10) Patent No.: US 6,174,245 B1
(45) Date of Patent: *Jan. 16, 2001

(54) GOLF BALL WITH LIQUID CENTER

(75) Inventors: Lawrence E. Stanton, Stoughton; Walter L. Reid, Jr., Mattapoisett, both of MA (US); Stephen K. Scolamiero, Bristol, RI (US); Jeffrey L. Dalton, North Dartmouth; Murali Rajagopalan, South Dartmouth, both of MA (US)

(73) Assignee: Acushnet Company, Fairhaven, MA (US)

( * ) Notice: Under 35 U.S.C. 154(b), the term of this patent shall be extended for 0 days.

This patent is subject to a terminal disclaimer.

(21) Appl. No.: 09/083,152

(22) Filed: May 22, 1998

Related U.S. Application Data (63) Continuation-in-part of application No. 08/868,170, filed on Jun. 3, 1997, now Pat. No. 5,922,252, which is a continuation-in-part of application No. 08/691,756, filed on Aug. 2, 1996, now Pat. No. 5,836,831, which is a continuation-in-part of application No. 08/615,346, filed on Mar. 11, 1996, now Pat. No. 5,683,312.

(51) Int. Cl.[7] .................................................. A63F 37/08
(52) U.S. Cl. .......................................................... 473/354
(58) Field of Search .................. 473/354, 357, 473/363

(56) References Cited

U.S. PATENT DOCUMENTS

| | | | |
|---|---|---|---|
| 878,070 | 2/1908 | Kingzett | 473/354 |
| 1,298,410 | 3/1919 | Schupphaus | 473/354 |
| 1,530,820 | 3/1925 | Evans et al. | 473/354 X |
| 1,568,513 | 1/1926 | Lewis . | |
| 1,568,514 | 1/1926 | Lewis | 473/354 X |
| 1,622,601 | 3/1927 | Miller . | |
| 1,904,012 | 4/1933 | Reichard . | |
| 3,098,658 | 7/1963 | Murphy et al. | 273/230 |
| 3,458,206 | 7/1969 | Kane et al. | 273/230 |
| 3,490,770 | 1/1970 | Satchell | 273/230 |
| 4,244,855 | 1/1981 | Cox et al. | 273/231 |
| 4,431,193 | 2/1984 | Nesbitt | 273/235 |
| 4,564,199 | 1/1986 | Adams | 473/354 X |
| 4,904,320 | 2/1990 | Isaac et al. | 156/146 |
| 4,919,434 | 4/1990 | Saito | 273/235 |
| 4,943,332 | 7/1990 | Sakaguchi et al. | 156/146 |
| 5,033,749 | 7/1991 | Kakiuchi et al. | 273/227 |
| 5,150,906 | 9/1992 | Molitor et al. | 273/220 |
| 5,253,871 | 10/1993 | Viollaz | 273/228 |
| 5,314,187 | 5/1994 | Proudfit | 273/235 |
| 5,439,227 | 8/1995 | Egashira et al. | 473/377 X |
| 5,467,994 | 11/1995 | Moriyama et al. | 273/222 |
| 5,480,155 | 1/1996 | Molitor et al. | 273/220 |
| 5,624,332 | 4/1997 | Dalton et al. | 473/354 |
| 5,683,312 | * 11/1997 | Boehm et al. | 473/354 |
| 5,836,831 | * 11/1998 | Stanton et al. | 473/354 |

FOREIGN PATENT DOCUMENTS

| | | |
|---|---|---|
| 1049573 | 11/1966 | (GB) . |
| 247862 | 4/1992 | (JP) . |

\* cited by examiner

Primary Examiner—Raleigh W. Chlu
(74) Attorney, Agent, or Firm—Pennie & Edmonds LLP (57) ABSTRACT

The present invention is directed toward the novel use of thermoplastic materials to form center core shells for use in liquid filled golf balls. Golf balls of the present invention employ liquid filled centers formed from thermoplastic shells, preferably made of a polyether-ester, the shells having a tensile modulus of about 3 ksi to about 10 ksi, preferably a hardness of about 20 to about 80 shore D, preferably a flexural modulus of about 5.5 ksi to about 8.5 ksi, preferably a wound layer, and preferably a specific gravity of greater than 1.5. The shell has a thickness of about 0.005 inches to about 0.5 inches.

19 Claims, 1 Drawing Sheet

FIG. 1

GOLF BALL WITH LIQUID CENTER

CROSS REFERENCE TO RELATED APPLICATIONS

This application is a continuation-in-part of U.S. application Ser. No. 08/868,170, filed Jun. 3, 1997, now U.S. Pat. No. 5,922,252 which is a continuation-in-part of U.S. application Ser. No. 08/691,756, filed Aug. 2, 1996, now U.S. Pat. No. 5,836,831 which is a continuation-in-part of U.S. application Ser. No. 08/615,346 filed Mar. 11, 1996 now U.S. Pat. No. 5,683,312.

FIELD OF INVENTION

This invention relates generally to golf balls having liquid filled centers, and more particularly to methods for forming liquid filled centers and golf balls containing such centers.

BACKGROUND OF THE INVENTION

Currently, golf balls are generally classified based on their constructions as either a one-piece, two-piece or three-piece ball. The difference in play characteristics resulting from these different types of constructions can be quite significant. The one-piece ball typically comprises a homogenous mass of polybutadiene, monomers, fillers, antioxidants, curing agents, and the like. These types of balls are generally inexpensive and durable, but do not provide superior distance or spin. Typically one-piece balls are manufactured for used as range balls or practice balls.

Often, it is desirable to select a relatively "hard" material such as an ionomer resin as the cover material so as to impart a high degree of durability to the golf ball. Two piece balls are made with a solid core, usually made of a polymeric or crosslinked rubber material which is encased by a cover material. Typically the solid core is a high-energy acrylate or resin and is covered by a tough, cut-proof blended cover. The cover material can be formed from any one of a number of conventional materials including ionomer resins such as SURLYN® (Du Pont), or an elastomer. The combination of the core and cover materials provide a "hard" ball that is very durable. Further, such a combination imparts a high initial velocity to the ball which results in improved distance. Because these materials are very rigid, two piece balls have a hard "feel" when struck with a club. Likewise, due to their hardness, these balls have a relatively low spin rate which makes them difficult to control, particularly on shorter approach shots. Nonetheless, balls having a two piece construction are generally most popular with the average recreational golfer because they provide a very durable ball while also providing maximum distance.

Some three-piece balls are referred to as "wound" balls due to their construction. Wound balls typically have either a solid rubber or hollow liquid center core around which many yards of a stretched elastic thread or yarn-like material is wound. Typically, the hollow liquid filled center core is made of a thermoset material such as a natural or synthetic rubber or blends thereof. The wound core is then covered with a durable cover material such as a SURLYN® or similar material or a softer cover such as balata or polyurethane. Wound balls are the preferred ball of the more advanced players due to their superior spin and feel characteristics. Wound balls are generally softer and provide more spin than a one or two piece ball which enables a skilled golfer to have more control over the ball's flight. Moreover, as a result of their more complex structure, wound balls generally require a longer time to manufacture and are more expensive to produce than a two piece ball.

Initially, wound balls were manufactured having a solid center core. However, it was eventually discovered that wound balls with a liquid-filled center provided superior playing and "feel" characteristics. Accordingly, a number of methods for producing liquid filled centers are disclosed in the prior art. For example, in one method, a suitable liquid is encapsulated within a gelatin capsule to form a liquid filled sphere. This sphere is then frozen, covered with two preformed hemispherical rubber shells and placed in a heat mold. In the mold, the rubber shells are vulcanized to provide adequate strength to the sphere so it can be used as a liquid filled center.

Another method includes placing a liquid or paste material into a spherical mold and freezing the material to form a solid core material. A non-vulcanized rubber coating is subsequently placed over the frozen sphere and vulcanized to form a rubber outer shell which retains the liquid material. A variation of this method is described in U.S. Pat. No. 3,490,770, wherein a spherical mold is filled with a liquid material which is convertible to a solid molecular structure by, e.g., thermosetting, polycondensation, catalytic conversion, or by other chemical conversion mechanisms. The mechanism for solidification is employed so as to provide a solid skin which encloses the remaining, unreacted liquid.

Still another method of creating a liquid filled center involves vulcanizing two rubber hemispheres, applying an adhesive to the outer "lip" of the hemispheres and assembling the two hemispheres to create a sphere which is subsequently vulcanized. Liquid is then injected into the sphere through the use of a hypodermic needle and the resulting puncture hole is sealed. Typically a patch, with or without an adhesive material is used to seal the hole. Additionally, it is also known to insert a conical shaped plug into the hole wherein the plug is secured with an adhesive or some other means in order to seal the hole. Such adhesives tend to be difficult to apply and the surface area they cover must be completely free of contamination for proper adhesion.

Alternatively, as described in U.S. Pat. No. 4,943,332, the hemispheres can be submerged in a desired liquid before the two halves are joined and either vulcanizing the sphere while submerged or upon removal from the liquid.

In one conventional commercial method of producing liquid centers for golf balls, the center is made from a natural rubber compound, wherein the base rubber material and other ingredients are mixed on an open mill. After the rubber stock is thoroughly mixed, the stock is placed in a calender which forms it into flat sheets. One sheet is placed into a die in which recessed cups are formed. A vacuum is placed on the die in order to pull the sheet into the cups.

A second sheet is then placed onto a vacuum die plate which opposes the first die. A small amount of water is sprinkled on top of the first sheet. The die assembly is then closed, pinching off bladders which consist of the two circular discs of rubber which are crimped at the edges and have a few drops of water trapped in the middle. The bladders are removed from the rubber sheets and placed in a bold which has hemispherical cavities defining the desired shape of the center. The mold is then heated, causing the trapped water to turn to steam, which in turn inflates the bladders against the mold wall. Continued heating causes the rubber to vulcanize into the desired hollow shape.

Subsequently, the center is filled by puncturing it with a hypodermic needle and injecting a fluid of a controlled density. The needle is then removed and the center is washed to remove any excess filling solution. The hole is plugged with an adhesive material which crosslinks into a solid when exposed to ultraviolet light. At this point, the liquid filled center construction is complete and ready for the winding phase of the golf ball construction.

Very few materials suitable for use in the shell of the liquid filled center, especially for use in a wound ball, are disclosed in the prior art. For example, U.S. Pat. No. 4,943,332 discloses the use of conventional rubbers such as natural rubber, butadiene rubber, isoprene rubber or a mixture thereof. Likewise, U.S. Pat. No. 4,904,320 discloses that the center shells or envelopes are usually made of a natural rubber. Additionally, U.S. Pat. No. 4,244,855 discloses a center core formed of a non-cross-linked, butadiene-styrene radial block copolymer and a large portion of filler material. However, natural rubber, synthetic rubber and blends thereof remain the industry standard as material for the liquid filled center shell.

U.S. Pat. Nos. 5,150,906 and 5,480,155 are both directed towards non-wound golf balls wherein a relatively large diameter, pre-formed shell rather than a core is the starting point for the balls. Both of these patents explicitly distinguish golf balls which are made by forming a center core, such as a liquid-filled rubber bladder, and then molding a layer or a winding around the center core. Instead, these patents disclose forming a golf ball from a shell into which a liquid is injected to form the core material, wherein the shell may be the outer layer of the ball or may be slightly smaller than the final diameter of the ball and have a cover thereon. The liquid material may either remain a liquid or subsequently react to form a solid core. The shell may be formed out of any number of materials, including a variety of thermoplastic materials. The hole through which the liquid is injected is plugged with a conical plug which is secured by ultrasonic, vibrational laser or solvent bonding, compression molding or adhesive bonding.

Presently, conventional processes for producing a liquid filled center core are rather complicated and labor intensive, requiring a number of distinct and separate process steps. For example, conventional processes typically require that the steps of milling, calendaring, forming and molding the hollow center cores all be performed separately. Due to the complicated nature of the conventional processes, the manufacture of the liquid-filled centers is very time consuming and labor intensive. Accordingly, due to the large amount of labor and time involved, conventional liquid filled centers are relatively expensive to produce.

The difficulty in producing the conventional liquid filled centers is directly related to the materials from which the center shells are typically made. As discussed above, natural and synthetic rubbers and blends thereof are overwhelmingly used in conventional liquid filled spheres. These materials are generally described as "thermosetting" materials, a term generally used to describe polymeric materials which solidify or "set" irreversibly when heated or exposed to radiation or a chemical reaction.

Thermosetting polymers consist of linear chains having numerous functional groups or double bonds distributed along the chains, which are capable of forming crosslinks on further polymerization reactions. This may occur upon exposure to heat or other radiation or by adding catalysts, resulting in a three-dimensional network that makes the polymer infusible and insoluble. Since the crosslinks are strong covalent bonds that can only be broken at high temperatures at which the organic polymer would be completely decomposed, the thermosetting polymer, once it is fully crosslinked, is infusible and insoluble for all practical purposes; it cannot be remelted, remolded or dissolved. Thus, the methods for making center core shells from thermosetting materials typically require several additional processing steps due to the physical and chemical properties of the thermoset materials.

Accordingly, a need exists for materials which are not thermosetting, such as thermoplastic materials, which are suitable for use as center core shell materials. Additionally, it would be desirable if the physical properties of the materials for use as center core shells were such as to facilitate a simplification of the processes employed to produce the liquid filled golf ball center. Further, a need exists for simpler and more commercially practical methods for making liquid filled golf ball centers and golf balls employing such centers.

OBJECT OF THE INVENTION

An object of the present invention is to provide novel methods for producing liquid filled center core shells from a variety of thermoplastic materials, as well as producing golf balls employing such centers.

A further object of the present invention is to provide novel methods for sealing thermoplastic liquid filled center core shells.

SUMMARY OF THE INVENTION

The present invention is directed towards liquid filled center core shells made from thermoplastic elastomers and golf balls employing such centers. Liquid filled wound golf balls employing these thermoplastic materials provide equivalent or improved play characteristics as wound balls employing a conventional rubber based liquid filled center core.

The liquid filled centers of the present invention are not, however, limited for use in conventional wound balls. To the contrary, it is contemplated that the liquid filled centers of the present invention are useful in golf balls which comprise at least one and preferably more than one layer of a solid material interposed between the liquid filled center core and the cover such as those disclosed in U.S. Pat. No. 5,683,346, which is incorporated by reference herein.

More particularly, the present invention is directed towards a golf ball comprising a liquid filled center core shell wherein the center core shell has a diameter of about 1.15 inches and is about 0.8 inches thick. The center core shell is formed from a material having a tensile modulus between about 4 ksi and 6 ksi and a flexural modulus between about 5.5 ksi and 8.5 ksi. The present invention is also directed towards a golf ball comprising a liquid filled center core shell wherein the center core shell is formed from a material having a hardness greater than 30 Shore D and, more particularly, between 30 and 40 Shore D, and a specific gravity of greater than 1.5. Most preferably, the center core shell is formed of thermoplastic elastomer with a filler material that has the properties above.

DETAILED DESCRIPTION OF THE INVENTION

This invention is particularly directed towards liquid filled center core shells for use in golf balls having improved characteristics. Specifically, the present invention is directed towards materials for forming center core shells for inclusion in a liquid filled center golf ball wherein the center core shell is formed from a thermoplastic material. As used herein, the term thermoplastic means a linear polymer, including straight-chain and/or branched macromolecules, that are capable of being repeatedly melted or softened and subsequently rehardened when cooled below its softening temperature. The polymer can be heated and cooled repeatedly, as long as it is not heated above its decomposition point. This is because the polymer chains are held only by intermolecular forces that are relatively weak and permit easy movement and sliding of the chains under small temperature changes. As used herein, the term polymer means any type of polymer including random polymers, block polymers, graft polymers, etc.

Figure 1:
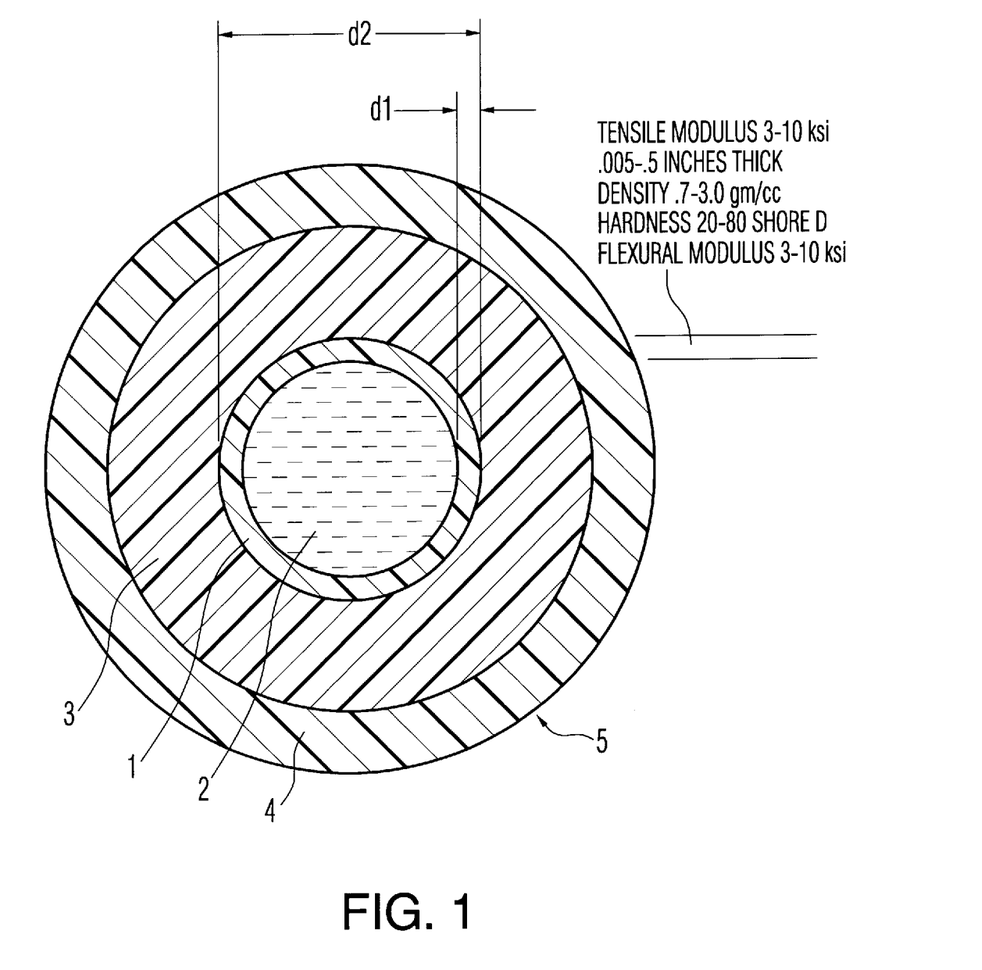
FIG. 1 is a cross-sectional drawing which illustrates one example of a ball in accordance with the present invention.

FIG. 1 provides a cross sectional view of a golf ball according to one embodiment of the present invention. The golf ball 5 includes a hollow, spherical center core shell 1 having its hollow interior filled with a liquid 2. An outer layer 3 is formed by winding rubber thread around the outer circumference of center core shell 1 or by molding a solid thermoset of thermoplastic material around the center core shell. A cover 4 encases the outer layer 3.

Applicants have found that certain thermoplastic materials are useful in forming liquid filled centers. Prior to the present invention, it was a general consensus in the golf ball art that a wound golf ball formed of a thermoplastic liquid filled sphere would exhibit inferior in-play characteristics such as decreased initial velocity as compared to conventional wound golf balls formed using conventional liquid filled thermosetting rubber "bags" or spheres. This belief was due, in part, because thermoplastic materials have historically exhibited higher hysterisis energy losses than elastomers such as natural rubber when subjected to rapid strain, such as when struck with a golf club. However, it has been now discovered that certain thermoplastic materials having the material properties set forth below are highly suitable to provide a liquid filled center shell for golf balls. Golf balls made with shells formed from these materials exhibit equal, and for some thermoplastic materials, even better in-play characteristics than balls having conventional liquid filled rubber center shells.

A large number of thermoplastic polymeric materials are contemplated as being useful in the center core shells of the present invention. The thermoplastic materials may be employed alone or in blends. Suitable thermoplastic materials include but are not limited to rubber modified polyolefins, polymers formed with metallocene-catalysis (hereinafter "metallocene catalyzed polymers"), polyether-ester block copolymers, polyether-amide block copolymers, ionomers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephalate, polymethylpentene, silicone, polyvinyl chloride, thermoplastic polyurethane, polycarbonate, polyurethane, polyamide, polybutylene, polyethylene and blends thereof.

Of the suitable materials described above, preferred thermoplastic materials include rubber modified polyolefins, metallocene-catalyzed polymers, polyether-amide block copolymers and polyether-ester block copolymers. Preferred rubber modified polyolefins are commercially available under the tradenames Vistaflex (Advanced Elastomer Systems), Kraton (Shell), Hifax (Montell), X1019-28 (M. A. Hanna), Sarlink (DSM), and Santoprene (Advanced Elastomer Systems). Preferred metallocene-catalyzed polymers are available from Dow Corporation under the tradenames Engage and Affinity. Preferred polyether-amide block copolymers are available under the tradename Pebax (Elf Atochem). Preferred polyether-ester block copolymers are commercially available from DuPont under the tradename Hytrel.

The thermoplastic center core shells of the present invention may also comprise a suitable filler material added in order to adjust the properties of the finished center core shell. For example, the specific gravity or density of the center core shell may be adjusted by the addition of a suitable material, such as barium sulfate, zinc oxide, calcium carbonate, titanium dioxide, carbon black, kaolin, magnesium aluminum silicate, silica, iron oxide, glass spheres and wollastonite. The filler material may be present in any amount that will adjust the specific gravity of the center core shell, typically the shell contains from about 5 percent by weight to about 70 percent by weight filler. More preferably, the filler material is present in an amount less than about 55 weight percent.

Additionally, the thermoplastic center core shells of the present invention may further comprise a suitable plasticizer or other material added in order to improve the processability and physical properties, such as the flow properties, of the thermoplastic materials. Conventional plasticizers known in the art are contemplated as being suitable for use in the present invention. It is desirable that the thermoplastic center core shells of the present invention have a melt index of about 1 g/min. to about 52 g/min. Preferably, the thermoplastic center core shell has a melt index of about 1.5 g/min. to about 15 g/min. The plasticizer may be present in any amount that will adjust the flow properties of the center core shell materials to the values noted above.

The center core shells of the present invention preferably have a wall thickness d1 of about 0.005 to about 0.5 inch. Preferably the wall thickness d1 is about 0.01 to about 0.2 inch, more preferably about 0.03 to about 0.12 inch, and most preferably about 0.08 inch. The thickness of the center core shell walls typically correlates but is not necessarily limited to the manner in which the shell is produced. For example, the walls of center core shells produced by a blow molding process are generally thinner than those produced by other molding processes such as by injection molding. The preferred thickness for the center core shell wall will likely vary depending upon the performance requirements desired.

The center core shells of the present invention have an overall diameter d2 of up to about 1.3 inches, preferably from about 1 inch to about 1.25 inches and most preferably about 1.15 inches.

The method of manufacture will also affect other physical characteristics of the liquid filled golf ball centers of the present invention. For example, in a preferred embodiment of the present invention, the wall of the center core shell has a uniform thickness throughout. Such uniform thickness will result from the use of an injection molding method, such as the one described below to form the center core shell. This uniform thickness provides a beneficial contribution to a variety of in-flight characteristics of golf balls made with such cores including improved distance, accuracy and spin rate. Other molding methods for golf ball cores typically produce cores that are, to varying degrees, of a non-uniform thickness and as a result may be out-of-round, thereby adversely affecting the ball's in-flight and rolling or putting characteristics.

In one embodiment of the present invention, the liquid filled center is formed from a one-piece seamless spherical core shell. Such seamless core shells can be formed by one of the blow molding processes discussed in detail below. In another embodiment, the center core shells are formed by bonding two thermoplastic hemispheres together. Preferably, the thermoplastic hemispheres are formed by an injection molding process.

A number of the characteristics such as spin rate, initial velocity and "feel" of golf balls in which the present liquid filled centers are incorporated are affected by the physical properties of both the core shell material, core shell diameter and thickness, as well as the liquid employed to fill the shell. Accordingly, parameters for a number of physical properties of the core shell and liquid therein are considered to be important in optimizing the various play characteristics.

The center core shells of the present invention have a tensile modulus between about 3 ksi and 10 ksi and, preferably between about 4 ksi and 6 ksi. Further, the center core shells of the present invention have a flexural modulus between about 3 ksi and 10 ksi and, more particularly between about 5.5 ksi and 8.5 ksi.

Moreover, the center core shells of the present invention preferably have a hardness of about 20 Shore D to 80 Shore D. More preferably, the center core shells of the present invention have a hardness of about 30 to about 40 Shore D.

Further, the center core shells of the present invention preferably have a specific gravity of about 0.70 to about 3.0. More preferably the specific gravity of the center core shell is between about 1.25 and 2 and most preferably between about 1.5 and 2.

The liquid employed to fill the core shells preferably has a specific gravity of about 1.0 to about 1.6. More preferably, the liquid has a specific gravity of about 1.10 to about 1.6. The center core shells of the present invention may be filled with a variety of suitable liquids. Examples of suitable liquids include water, salt solutions such as sodium bromide, potassium iodide and the like, gel, viscous fluids such as corn syrup, alcohol or combinations thereof. Preferred liquids are salt solutions. Preferably, the liquids have a pH of between about 4 and 8, a freezing point above about −50° F. and a specific gravity of between about 1.0 and about 1.56 g/cm$^3$.

The liquid filled center core shells of the present invention may be produced using any one of several methods. In particular, these methods exploit the beneficial physical properties of thermoplastic materials in order to provide more efficient and cost effective methods for producing liquid filled center golf balls.

In a first method, the center core shells of the liquid filled centers of the present invention are formed from one-piece, seamless center core shells produced by a variety of conventional thermoplastic molding processes. For example, one suitable method is an extrusion blow molding process wherein a continuous tube or parison of a thermoplastic polymeric material is extruded by a conventional extrusion process, preferably in a downward direction. Typically, the parison weighs between about 2 to about 80 grams depending upon cavitation. The plastication temperature of the thermoplastic materials employed in this method is generally about 250° F. to about 600° F. The parison is introduced to two mold halves which form a spherical mold such that one end of the parison, preferably the bottom end, is fixed in the mold, wherein that end of the parison is crimped or pinched off, thereby closing one end of the parison.

A means for introducing an inflating medium, such as a needle, blow pin or pipe, is inserted or otherwise presented to the open end of the parison in order to inflate the parison. A sufficient amount of inflating medium such as pressurized or compressed air is introduced through the blowing pin so as to inflate the parison against the walls of the mold, thereby forming a seamless spherical core shell. The blow pressure is generally about 5 psi to about 200 psi. The blow pressure is applied to the parison for about 1 second to about 15 seconds. The appropriate blow pressure will vary depending on such factors as the thermoplastic material employed, the desired thickness of the shell wall, the overall diameter of the shell, etc. Center core shells produced by this embodiment of the present invention preferably have a wall thickness of about 0.005 inches to about 0.125 inches and an overall diameter of up to about 1.3 inches, but preferably less than 1.25 inches.

Co-extrusion blow molding is another method of forming one-piece, seamless liquid filled center core shells. Co-extrusion blow molding is similar to the process described above, but wherein a parison is extruded comprising two or more layers of either similar materials or dissimilar materials, e.g., high density polyethylene/regrind polyethylene/high density polyethylene; polypropylene/adhesive EVOH/adhesive/polypropylene; polyethyleneterephthalate/recycled polyethyleneterephthalate. The different layers may be employed to impart differing mechanical properties.

Still another method of forming one-piece, seamless liquid filled center core shells is by an injection blow molding process. In an injection blow molding process, a "shot" of thermoplastic polymeric material is injected into a closed preform mold cavity that contains a blow pin in its center such that the melted thermoplastic material fills the void between the preform cavity and the blow pin. The weight of the shot is typically about 1 to about 80 grams depending on cavitation. The thermoplastic materials employed in this embodiment of the present invention have a plastication temperature of about 200° F. to about 600° F. The material is injected into the preform mold at about 200 to about 18,000 psi plastic melt pressure.

The preform mold is then opened and the blow pin now holding an injection molded parison is transferred to the blow mold. Preferably, the blow mold has a spherical shape. A sufficient amount of an inflating medium such as compressed or pressurized air is introduced to the center of the thermoplastic mass through the blow pipe so as to inflate and cool the thermoplastic mass against the walls of the blow mold, thereby forming a seamless spherical core shell. As a result of such seamless characteristic, no secondary operations are required to bond parts together. Typically, the pressure of the inflating medium is about 10 psi to about 200 psi, and the blow time is about 0.05 seconds to about 15 seconds.

Alternatively, in another method, the center core shells of the present invention are formed by bonding two thermoplastic hemispheres. A preferred method of forming the center core shells of this embodiment of the present invention is by injection molding the hemispheres using processes well known in the art. In a conventional injection molding process, the thermoplastic polymeric material is injected into a closed mold to form a hemispherical shell. The thermoplastic materials employed in this process typically have a plastication temperature of about 200° F. to about 600° F.

The thermoplastic material is injected into the mold at about 30 psi to about 2,000 psi (hydraulic pressure). As is well known in the injection molding art, the injection molding process may include multiple stages which have different pressures and are held at each pressure for different periods of time. The hemispherical shells are removed from the mold and bonded to form a spherical core shell. The hemispherical shells have a wall thickness of about 0.010 inches to about 0.5 inches and a diameter of about 0.50 inches to about 1.3 inches. This injection molding process provides center core shells having a substantially uniform wall thickness.

The hemispherical shells formed can be bonded together to form a spherical center core shell through a variety of methods.

Preferably, non-contact heat sealing methods such as the use of radiant heat sources or hot air convection are employed to melt the contact surfaces of the hemispheres.

In such methods, the hemispheres do not actually contact the surface of the heat source. Instead a very small gap is maintained between the equator plane of the hemisphere and the heat source. The equator planes of the hemispheres are exposed to the heat for a sufficient amount of time so that the outer surface of the equator becomes molten. Immediately thereafter, two hemispheres are brought into contact with one another in order to fuse the hemispheres together to form a sphere. The temperature of the heat source will necessarily vary depending upon the materials used in forming the hemispheres as well as the desired time of exposure of the hemispheres.

After the sphere is formed, a finishing process such as die trimming or centerless grinding is employed to remove any flashing or excess material from the joining seam.

Alternatively, the two hemispheres can be joined by hot plate welding. In this method, the equator planes of two hemispheres are presented to a hot plate under pressure in order to melt the contact surface. After contacting the hot plate surface, the two hemispheres are brought into contact in order to fuse the melt surfaces together. As with radiant heat sealing, the temperature of the hot plate surface will necessarily vary depending upon the thermoplastic material employed. For most thermoplastics, the temperature of the hot plate surface which is brought into contact with the thermoplastic is typically about 250° F. to about 750° F. Preferably, the hot plate temperature is about 350° F. to about 550° F. The contact pressure is generally about 10 psi to about 100 psi, preferably about 40 psi to about 60 psi. The weld time required to fuse the melt surfaces is typically 1 second to about 30 seconds, preferably about 4 seconds to about 12 seconds.

Another method of joining the thermoplastic hemispheres is by spin welding. In this method, one of the hemispheres is rotated at high RPM and then its outer rim is brought into contact with the outer rim of a second hemisphere. The resulting friction generates a sufficient amount of heat to melt the polymer at the contact surface and form a satisfactorily bonded interface. Typically, one of the hemispheres is rotated at about 2,000 to about 20,000 RPM. The other hemisphere is placed against the rotating hemisphere for about 1 to about 15 seconds at a contact pressure of about 10 to about 200 psi.

The thermoplastic spherical core shell of the present invention may also be formed by joining two hemispherical shells by a variety of other well known means such as chemical bonding, thermal impulse welding, vibrational welding, ultrasonic welding, electromagnetic welding, tack welding, RF heat sealing, induction bonding, hot wire seaming, co-injection molding, or hot melt sealing.

The spherical center core shells of both the first and second embodiment of the present invention can be filled with a liquid by a number of methods.

When filling the center core shell with a liquid, it is desirable that substantially all of the air is removed from the shell so that the shell is substantially filled with the liquid. Thus, it is preferable that the method employed for filling the center include a means for removing substantially all of the air from the center. For example, the filling process may include a vacuum evacuation step to remove the air from the center core shell prior to introduction of the liquid.

Further, a coaxial hollow needle pair may be used to introduce the liquid wherein the inner channel of the needle is used to inject the liquid into the shell and the outer channel of the needle is used to vent the displaced air out of the center. When such a coaxial needle is used, it is preferable to use one of the channels of the needle to form a vacuum of about 5.0 to about 29.0 inches (Hg), more preferably about 15.0 to about 29.0 inches (Hg), most preferably about 28.0 to about 28.5 inches (Hg) in order to draw the liquid into the sphere.

A preferred method for filling the shell employs a single channel needle which is scored on a portion of its outer surface may be used to introduce the liquid. Such a scored needle provides vents at the point at which the shell is punctured which allow the air displaced by the liquid to escape.

The apertures or holes made by the needles can be sealed using a variety of methods such as the use of a thermally curable adhesive, a UV curable adhesive, a solvent or water-based paint, a hot melt adhesive or a polymeric material.

A preferred method for filling and sealing the shells is as follows. The center core shell is pierced with a scored single channel needle and filled with liquid (preferably a mixture of a salt solution and corn syrup). The needle is withdrawn and the area of the aperture is washed with water and air blown dry. The aperture is then "presealed" by cauterizing the material surrounding the aperture by contacting the material with a heated rod, causing the thermoplastic material to flow into the aperture. Preferably, the rod may have a protective coating such as Teflon to prevent the molten material from adhering to it and is heated to a temperature slightly higher than the melt temperature of the thermoplastic material.

The material surrounding the cauterized, presealed aperture is then exposed to a second heat source, preferably a second heated rod with a larger diameter than the first, to keep the material in a relatively molten state in order to enhance the bonding of the patch material. Further, most surface contamination becomes dissolved into the molten material, therefore minimizing its effect on the adhesion of the patch. A molten drop or "dollop" of thermoplastic material is dispensed over the center of the cauterized presealed area to form a patch over the aperture. Typically, about 0.02 to about 0.10 grams of patch material is dispensed onto the preseal area. The patch material can comprise essentially any thermoplastic material so long as it is compatible with the material used to form the center core shell, including those disclosed above as among those suitable for the center core shells. Preferably, the center core shell and patch are formed from the same thermoplastic material.

A finishing mold, preferably hemispherical and concave in shape, is contacted with the molten patch and thermoplastic shell material to provide a smooth, rounded seal on the outer surface of the center core shell. Preferably, the finishing mold is preheated to a temperature of about one-half that of the heated rods. As with the methods for bonding the hemispheres together, the temperature of the presealing, heating and dispensing of the molten drop of patch material will depend on the thermoplastic materials employed to form the center core shell and/or the patch material, which one of ordinary skill in the art could readily determine without any need for experimentation.

In another method of filling and sealing the centers of the second embodiment of the present invention, the center core shells are filled with a liquid by joining the hemispheres together while the hemispheres are submerged in a bath of such liquid. In this method, the hemispheres may be spin welded or otherwise bonded together while submerged in the liquid, thereby trapping the liquid inside the joined hemispheres to form a liquid filled center. This mode of filling the spheres is desirable in that it eliminates the need for patching or plugging any holes in the walls of the center.

In still another method, the center is filled by introducing the liquid through an inlet means which was integrally formed in a hemisphere or in the seamless centers during the molding thereof. Such centers can be made by any of the processes discussed above. In this method, the mold provides for an inlet means such as an aperture or hole through the wall of the hemisphere or seamless sphere. The center is filled with a liquid through this hole and then the hole is heat sealed by melting the thermoplastic material around it, causing the material to flow into the hole, sealing it. The thermoplastic may be melted using any conventional techniques such as hot air or hot plate (thermostaking) methods. A preferred method of sealing the spheres is blowing hot air on the inlet means and subsequently cold staking the molten material around the inlet means. Preferably, the inlet means comprises a protruded portion of thermoplastic material which extends from the outer surface of the center core shell such that upon heat sealing, only this portion of thermoplastic material melts and flows into the hole, sealing the sphere.

The center core shells of the present invention are typically employed in a golf ball having a "wound" construction wherein a length of elastic threadlike material is wound around the center core shell to form a wound core. A cover material such as a conventional blend of ionomers is then molded around the wound core. However, center core shells of the present invention may also be employed in golf balls which comprise a center core shell around which at least one and preferably more than one layer of a solid material is compression or injection molded thereon to form an intermediate layer interposed between the liquid filled center core shell and the cover.

Without further elaboration, it is believed that one of ordinary skill in the art can, using the preceding description, utilize the present invention to its fullest extent. The following examples are merely illustrative and in no manner is the present invention limited to the specific disclosures therein.

EXAMPLE 1

In this example, the center core shells were formed by the method described below. Engage 8200, a metallocene catalyzed material commercially available from Dow, was injection blow molded to form spheres. The spheres were formed using a multi-zoned, multi-staged 85 ton Jomar, vertical screw injection blow molding machine having a single spherical cavity mold. The temperature profile of the zones and the pressures for each stage are illustrated in Tables 1 and 2 respectively. Additional process parameters are given in Tables 3 and 4.

TABLE 1

| Zone 1 | 170° C. |
| Zone 2 | 170° C. |
| Zone 3 | 170° C. |
| Zone 4 | 170° C. |
| Zone 5 | 180° C. |
| Parison Shank | 125° C. |
| Parison Neck | 110° C. |
| Parison Center | 125° C. |
| Parison Bottom | 225° C. |

TABLE 2

| Hydraulic Pressure | |
| --- | --- |
| Injection pressure | 190 psi |
| 1st blow pressure | 120 psi |

TABLE 3

| Cycle time | 9.7 sec. |
| Blow | .55 sec. |
| Preform delay | 1.0 sec. |
| Preform (LP) | 3.0 sec. |
| Cure time | 3.5 sec. |
| Decompress time | 0.6 dec. |
| Blow air delay | 1.0 sec. |
| 1st blow air | 6.5 sec. |

TABLE 4

| Shot weight | 2.03 grams |
| Screw forward | 45 rpm |
| Screw reverse | 35 rpm |
| Screw pressure | 1300 psi |
| Cooling time | 28 s |
| Recovery time | 6 s |

These spheres or center core shells were then filled with a liquid mixture of potassium carbonate and water, wherein such mixture had a specific gravity of about 1.40 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods and tested for a variety of play characteristics, the results of which are reported in Table 15.

EXAMPLE 2

In this example, the center core shells were formed by the following method. Engage 8150, a metallocene-catalyzed material commercially available from Dow was extrusion blow molded to form a sphere. The spheres were formed using a multi-zone Battenfeld FHB 106-2 80/24D extruder with high output screw having a single mold cavity and a S1-35-T-PE head. The temperature profile of the zones and process parameters are illustrated below in Table 5 and Table 6.

TABLE 5

| Zone 1 | 350° F. |
| Zone 2 | 350° F. |
| Zone 3 | 350° F. |

TABLE 5-continued

| | |
|---|---|
| Zone 4 | 350° F. |
| Zone 5 | 350° F. |
| Zone 6 | 350° F. |
| Zone 7 | 350° F. |
| Zone 8 | 350° F. |
| Zone 9 | 350° F. |

TABLE 6

| | |
|---|---|
| Heading tooling | 30 mm diverging |
| Blow time | 7 s |
| Vent time | 8 s |
| Extruder speed | 2 rpm |
| Melt temperature | 310° F. |

The spheres or center core shells were subsequently filled with a mixture of potassium carbonate and water, wherein the mixture had a specific gravity of about 1.40 gm/cc. The center core shells were filled through a preformed inlet hole having a portion of thermoplastic material protruding from the shell, then sealed with a hot air, cold staking process. The liquid filled center core shells were then used to form a wound golf ball using conventional manufacturing methods and tested for a variety of play characteristics, the results of which are reported in Table 15.

EXAMPLE 3

In this example, the center core shells were formed by the following method. Vistaflex 671-N, a rubber modified polyolefin, commercially available from Advanced Elastomer Systems was extrusion blow molded to form a sphere. The spheres were formed using a multi-zone Battenfeld FHB 106-2 80/24D extruder with high output screw having a single mold cavity and a S1-35-T-PE head. The temperature profile of the zones and other process parameters are illustrated below in Table 7 and Table 8.

TABLE 7

| | |
|---|---|
| Zone 1 | 300° F. |
| Zone 2 | 310° F. |
| Zone 3 | 310° F. |
| Zone 4 | 310° F. |
| Zone 5 | 310° F. |
| Zone 6 | 310° F. |
| Zone 7 | 310° F. |
| Zone 8 | 310° F. |
| Zone 9 | 310° F. |

TABLE 8

| | |
|---|---|
| Head tooling | 30 mm diverging |
| Blow time | 7 s |
| Vent time | 8 s |
| Extruder speed | 2 rpm |
| Melt temperature | 310° F. |

The shot weight was about 30 grams. The resulting sphere had a weight of about 4.1 grams and a wall thickness of about 0.025 to about 0.04 inches.

The spheres or center core shells were subsequently filled with a mixture of potassium carbonate and water, wherein the mixture had a specific gravity of about 1.40 gm/cc. The center core shells were filled through a preformed inlet hole having a portion of thermoplastic material protruding from the shell, then sealed with a hot air, cold staking process. The liquid filled center core shells were then used to form a wound golf ball using conventional manufacturing methods and tested for a variety of play characteristics, the results of which are reported in Table 15.

EXAMPLE 4

In this example, the center core shells were formed by the method described below. Vistaflex 671-N, a rubber modified polyolefin, commercially available from Advanced Elastomer Systems was injection molded to form hemispheres. The hemispheres were formed using a multi-zoned, 85 ton Cincinnati injection molding machine having dual cavity hemispherical molds with flat bonding surfaces. The temperature profile, pressures and other process parameters are illustrated in Tables 9 and 10 below.

TABLE 9

| Temperatures | |
|---|---|
| Rear zone | 300° F. |
| Center zone | 350° F. |
| Front zone | 360° F. |
| Nozzle | 370° F. |
| Mold moving | 115° F. |
| Mold fixed | 55° F. |
| Pressures (hydraulic) | |
| Fill | 724 psi |
| Pack | none |
| Hold | 100 psi |

TABLE 10

| Timers | |
|---|---|
| Boost | 5 s |
| Pack | none |
| Hold | 3.0 s |
| Cooling | 30 s |
| Shot size | 1.25 in |
| Cushion | 0.28 in |
| Screw rpm | 170 @ 50% |
| Ram velocity | 10. in/s |

The hemispheres were subsequently joined to form a sphere using hot plate or spin welding processes. These spheres or center core shells were then filled with a liquid mixture of potassium carbonate and water, wherein such mixture had a specific gravity of about 1.40 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods and tested for a variety of play characteristics, the results of which are reported in Table 15.

EXAMPLE 5

In this example, the center core shells were formed by the method described below. Affinity PF 1140, a metallocene-catalyzed material available from Dow, was injection molded to form hemispheres. The hemispheres were formed using a multi-zoned, multi-staged 83 ton Arburg injection molding machine, having a dual cavity hemispherical molds with flat bonding surfaces. The temperature profile of the zones and the pressures for each stage are illustrated in Tables 11 and 12 respectively, and other process parameters are illustrated in Tables 13 and 14 below.

TABLE 11

| | |
|---|---|
| Feed zone | 90° F. |
| Zone 1 | 390° F. |
| Zone 2 | 400° F. |
| Zone 3 | 405° F. |
| Nozzle | 400° F. |
| Platens | 50° F. |

TABLE 12

| Hydraulic Pressure | |
|---|---|
| 1st stage | 390 psi |
| 2nd stage | 370 psi |
| Injection | 554 psi |
| Holding | 380 psi |
| Back | 45 psi |

TABLE 13

| Mold Temps | |
|---|---|
| Stationery | 50° F. |
| Moving | 50° F. |
| Shot size | 32 mm |
| Cushion | 5 mm |

TABLE 14

| | |
|---|---|
| Shot weight | 7.9 grams |
| Screw rpm | 75 |
| Fill time | 0.68 s |
| Hold time | 6.1 s |
| Cooling time | 28 s |
| Recovery time | 6 s |

Some of the hemispheres were subsequently joined to form a sphere using a hot plate process. Others were joined using a spin welding process. These spheres or center core shells were then filled with a liquid mixture of potassium carbonate and water, wherein such mixture had a specific gravity of about 1.40 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods and tested for a variety of play characteristics, the results of which are reported in Table 15.

EXAMPLE 6

Table 15 below provides the compression, the velocity, the Driver spin rate and the 8 iron spin rate for wound golf balls made using the liquid filled centers of the invention described above in Examples 1–5 wherein the balls were constructed using conventional manufacturing methods. This data was gathered using a True Temper Hitting machine, a Titleist Launch Monitor (LM) and an Atti Compression Test Machine equipped with a Federal Dial Gauge Model 081-C.

TABLE 15

| Center Core Material | Center Molding Process | Compression | Finished Ball Velocity (ft/sec) | Driver Launch Angle | Driver Spin Rate (RPM) | 8 Iron Launch Angle | 8 Iron Spin Rate (RPM) |
|---|---|---|---|---|---|---|---|
| Control Tour Balata 100 (Thermoset Rubber) | Compression | 86 | 252.5 | 8.8 | 3879 | 18.4 | 9301 |
| Vistaflex 671-N | Injection | 92 | 254.2 | 9.0 | 4007 | 18.6 | 9505 |
| Affinity PF 1140 | Injection | 96 | 252.8 | 9.0 | 3910 | 18.6 | 9387 |
| Engage 8150 | Extrusion Blow Molded | 87 | 254.1 | 9.0 | 3906 | 18.9 | 9260 |
| Vistaflex 671-N | Extrusion Blow Molded | 88 | 253.8 | 9.0 | 3931 | 19.0 | 9322 |
| Engage 8200 | Injection Blow Molded | 94 | 255.7 | 8.9 | 3975 | 18.3 | 9564 |

EXAMPLE 7

In this example, a number of center core shells were formed from a variety of thermoplastic materials. The thermoplastic materials were injection molded mixed with either zinc oxide or barium sulfate to adjust specific gravity in accordance with the methods of the present invention to form a sphere. The spheres or center core shells were subsequently filled with a mixture of potassium carbonate and water, wherein the mixture had a specific gravity of about 1.40 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods.

The finished golf balls were then tested for a variety of play characteristics using a True Temper Hitting Machine, a Titleist Launch Monitor and an Atti Compression Test Machine equipped with a Federal Dial Gauge Model D81-C. Table 16 below provides the compression, the velocity, the driver spin rate, the 5 iron spin rate and the 8 iron spin rate for these golf balls.

TABLE 16

| Material | Compression | Velocity (FPS) | Driver Spin (RPM) | Driver Launch Angle | 5 Iron Spin (RPM) | 5 Iron Launch Angle | 8 Iron Spin (RPM) | 8 Iron Launch Angle |
|---|---|---|---|---|---|---|---|---|
| Santoprene 201-55 | 97 | 253.6 | 3845 | 9.0 | 7568 | 12.2 | 9381 | 18.5 |
| Pebax 3533 | 98 | 254.4 | 3743 | 9.0 | 7515 | 12.1 | 9350 | 18.5 |
| Kraton 7720 | 96 | 252.8 | 3890 | 9.0 | 7504 | 12.1 | 9352 | 18.5 |
| Kraton 7722 | 96 | 252.2 | 3795 | 9.0 | 7478 | 11.9 | 9316 | 18.6 |
| Hifax X-26 | 99 | 251.4 | 3743 | 9.0 | 7383 | 12.1 | 9300 | 18.6 |
| M.A. Hanna X-28 | 96 | 254.0 | 3840 | 9.1 | 7426 | 12.1 | 9293 | 18.5 |
| Sarlink 3150 | 96 | 252.7 | 3919 | 9.2 | 7449 | 12.2 | 9384 | 18.6 |
| Dow Metallocene | 97 | 253.5 | 3677 | 9.1 | 7310 | 12.2 | 9299 | 18.6 |
| Thermoset Rubber (Control) | 93 | 253.7 | 3718 | 9.0 | 7173 | 12.0 | 9195 | 18.2 |

EXAMPLE 8

Center core shells are formed by injection molding hemispheres of (1) a polyether-amide block copolymer commercially available from Elf Atochem as Pebax 3533 containing approximately 50% by weight barium sulfate filler, (2) a polyether-ester block copolymer available from DuPont as Hytrel 3078 containing approximately 50% by weight barium sulfate filler and (3) Hytrel 3078 containing approximately 50% by weight zinc oxide filler. The hemispheres are subsequently bonded together to form a sphere using a radiant heat bonding process. In particular, the equators of each hemisphere are placed immediately adjacent to a radiant heat source having a temperature sufficient to melt the equator of the hemispheres. The equators of the hemispheres are exposed to the heat source for a sufficient time to partially melt the equator plane surface and then are contacted with one another to fuse the hemispheres together to form a sphere. The seam where the hemispheres are joined is smoothed using a conventional die trim operation.

The center core shell is then punctured with a 0.100 inch diameter single channel needle having scored outer surface. Approximately 8.1 c.c.'s of a salt solution and corn syrup mixture is injected into the center core shell. The needle is withdrawn and the area surrounding the aperture is washed with water and dried by blowing air on the area for approximately 6 seconds. The aperture is then presealed by cauterizing the material surrounding the aperture by contacting the material with a Teflon coated first (preseal) rod heated to a temperature of about 425° F. at a pressure of about 5 psi for about 5 seconds. The rod is subsequently withdrawn and the sphere is exposed to a second (preheat) rod having a larger diameter than the first rod and heated to a temperature of about 420° F.

While the material surrounding the cauterized area is still molten, a molten patch of approximately 0.05 grams of the Pebax or Hytrel above is dispensed from a melt extruder model RCPMT-0500 Microtruder (Randcastle Extrusion Systems, Inc). The dispenser nozzle is maintained at a temperature of about 385° F. and a melt pressure of about 200 psi. The molten patch of Pebax is dispensed in the center of the cauterized presealed area.

A spherical, concave finishing mold with a 0.562" spherical radius is contacted with the molten patch and molten cauterized presealed area at a pressure of about 5 psi to form a smooth and rounded patched area. The temperature of the finishing mold is approximately 160° F.

A length of elastic thread is wound about the shell using a conventional method to form a wound core. A polyurethane cover blend according to U.S. Pat. No. 5,334,673, which is incorporated herein by reference, is subsequently cast around the wound core and the cover is subjected to a conventional buffing and other finishing precesses to form a finished wound ball.

TABLE 17

| | Pebax 3533 w/BaSO$_4$ | Hytrel 3078 w/BaSO$_4$ | Hytrel 3078 w/ZnO |
|---|---|---|---|
| Tensile Modulus (ksi) | 4.8 ± 0.4 | 5.1 ± 0.7 | 3.5 ± 0.4 |
| Flexural Modulus (ksi) | 7.4 ± 0.1 | 8.3 ± 0.1 | 6.4 ± 0.2 |
| Specific Gravity (gm/cc) | 1.77 | 1.78 | 1.79 |
| Rebound Resiliency (% return) | 55 | 50 | 61 |
| Hardness Shore D | 34 | 33 | 31 |
| Melt Flow Index (gm/10 min) | 10.7 | 7.0 | 16.2 |
| Total Energy (ft. lbs) | 7.8 ± 0.3 | 9.2 ± 0.4 | 11.2 ± 0.4 |
| Deflect @ Max Load (in) | 0.7 | 0.7 | 0.8 |
| Energy @ Max Load (ft. lbs) | 4.8 ± 0.2 | 5.3 ± 0.5 | 8.4 ± 0.2 |

TABLE 18

Wound Golf Ball Test Results

| | Pebax 3533 w/BaSo$_4$ | Hytrel 3078 w/BaSO$_4$ | Hytrel 3078 w/ZnO |
|---|---|---|---|
| Ball Compression | 95 | 95 | 94 |
| Velocity (ft/s) | 251.9 | 252.6 | 252.5 |
| Coef of Restitution | 0.795 | 0.801 | 0.799 |

What is claimed is:

1. A golf ball comprising:
    a) a liquid filled center comprising a center core shell having an outer diameter of less than 1.3 inches, having a thickness between 0.005 inches and 0.5 inches, and having a flexural modulus between 3 ksi and 10 ksi;
    b) an Outer layer of windings surrounding the liquid filled center; and
    c) a cover surrounding the outer layer.

2. The golf ball of claim 1, wherein the center core shell is comprised of a thermoplastic material.

3. The golf ball of claim 2, wherein the thermoplastic material comprises a rubber modified polyolefin, a polyether amide block copolymer, a polyether-ester block copolymer or a metallocene.

4. The golf ball of claim 2, wherein the thermoplastic material comprises a polyether-amide block copolymer.

5. The golf ball of claim 1, wherein the center core shell comprises a seamless sphere.

6. The golf ball of claim 1, wherein the center core shell has a uniform wall thickness.

7. The golf ball of claim 1, wherein the center core shell has a density of 0.7 to 3.0 gm/cc.

8. The golf ball of claim 1, wherein the center core shell has a tensile modulus of 3 ksi to 10 ksi.

9. The golf ball of claim 1 wherein the center core shell has a hardness of 30 to 40 shore D.

10. The golf ball of claim 1, wherein the liquid comprises a salt solution.

11. The golf ball of claim 1, wherein the center core shell has a tensile modulus of 4 ksi to 6 ksi.

12. The golf ball of claim 1, wherein the center core shell has a flexural modulus between 5.5 ksi and 8.5 ksi.

13. The golf ball of claim 1, wherein the center core shell thickness is between 0.01 to 0.12.

14. The golf ball of claim 1, wherein the outer layer is comprised of stretched elastic thread wound around the liquid filled center.

15. The golf ball of claim 1, wherein the outer layer is comprised of a solid thermoset material molded around the liquid filled center.

16. A golf ball comprising:
   a) a liquid filled center comprising a center core shell comprising a polyether-ester bock copolymer, the center core shell having an outer diameter of less than 1.3 inches having a thickness between 0.005 inches and 0.5 inches, and having a tensile modulus between 3 ksi and 10 ksi;
   b) an outer layer surrounding the liquid filled center; and
   c) a cover surrounding the outer layer.

17. A golf ball comprising:
   a) a liquid filled center comprising a center core shell made of a thermoplastic material having an outer diameter of less than 1.3 inches, and having a thickness between 0.005 inches and 0.5 inches;
   b) an outer layer of windings surrounding the liquid filled center; and
   c) a cover surrounding the outer layer
   wherein the thermoplastic material comprises a rubber modified polyolefin, a polyether amide block copolymer, a polyether-ester block copolymer or a metallocene.

18. The golf ball of claim 17, wherein the center core shell is a blow molded shell.

19. The golf ball of claim 17, wherein the center core shell is an injection molded shell.

* * * * *